(12) United States Patent
Chastagnier

(10) Patent No.: US 11,802,812 B2
(45) Date of Patent: Oct. 31, 2023

(54) DEVICE FOR MONITORING THE DEGRADATION OF ROLLING BEARINGS

(71) Applicant: Safran Electrical & Power, Blagnac (FR)

(72) Inventor: Jean-Michel Bernard Paul Chastagnier, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 83 days.

(21) Appl. No.: 17/603,191

(22) PCT Filed: Apr. 10, 2020

(86) PCT No.: PCT/EP2020/060319
§ 371 (c)(1),
(2) Date: Oct. 12, 2021

(87) PCT Pub. No.: WO2020/208226
PCT Pub. Date: Oct. 15, 2020

(65) Prior Publication Data
US 2022/0187166 A1 Jun. 16, 2022

(30) Foreign Application Priority Data
Apr. 12, 2019 (FR) ...................... 1903942

(51) Int. Cl.
*G01M 13/04* (2019.01)
*F16C 19/54* (2006.01)
*F16C 33/58* (2006.01)

(52) U.S. Cl.
CPC ............ *G01M 13/04* (2013.01); *F16C 19/54* (2013.01); *F16C 33/58* (2013.01); *F16C 2233/00* (2013.01)

(58) Field of Classification Search
CPC ......... G01M 13/04; F16C 19/54; F16C 33/58; F16C 2233/00
See application file for complete search history.

(56) References Cited

U.S. PATENT DOCUMENTS 6,089,757 A * 7/2000 Ouchi ................... F16C 19/186
384/448
6,109,793 A * 8/2000 Miyazaki ................ G01P 3/488
384/448

(Continued)

FOREIGN PATENT DOCUMENTS

| DE | 34 36 242 A1 | 4/1986 |
|----|----|----|
| EP | 0 397 309 A2 | 11/1990 |
| WO | WO 2017/162551 A1 | 9/2017 |

*Primary Examiner* — Eric S. McCall
(74) *Attorney, Agent, or Firm* — Birch, Stewart, Kolasch & Birch, LLP

(57) ABSTRACT

The present invention relates to a device (1) for monitoring the degradation of rolling bearings (15a, 15b) in a rotating machine (10) comprising at least two rolling bearings (15a, 15b) each having two concentric rings (16-18) rotating relative to each other, at least one ring (17, 18) of each bearing (15a) being rotationally connected to a ring (17, 18) of another bearing (15b). The device (1) comprises a member (30) for measuring the speed of rotation ($\omega_1$) of the rotationally connected rings (17, 18), and data processing means suitable for detecting a variation in the speed of rotation ($\omega_1$) of the rotationally connected rings (17, 18), which variation is representative of degradation of a bearing (15).

20 Claims, 3 Drawing Sheets

(56) References Cited

U.S. PATENT DOCUMENTS

| | | | | |
|---|---|---|---|---|
| 6,127,819 A * | 10/2000 | Ouchi | ............... | G01P 3/487 |
| | | | | 324/173 |
| 6,209,389 B1 * | 4/2001 | Sakamoto | ............... | G01P 3/487 |
| | | | | 73/494 |
| 6,287,009 B1 * | 9/2001 | Nakamura | ............... | G01P 3/446 |
| | | | | 384/625 |
| 6,323,640 B1 * | 11/2001 | Forestiero | ............... | G01P 3/443 |
| | | | | 324/207.25 |
| 6,339,964 B1 * | 1/2002 | Bertetti | ............... | F16C 33/7879 |
| | | | | 73/862.334 |
| 6,538,427 B1 * | 3/2003 | Silvasi | ............... | G01P 3/443 |
| | | | | 324/207.25 |
| 6,591,682 B1 * | 7/2003 | Lysen | ............... | G01N 29/14 |
| | | | | 702/56 |
| 2006/0222278 A1 | 10/2006 | Singh et al. | | |
| 2007/0031076 A1 * | 2/2007 | Shigeoka | ............... | F16C 33/805 |
| | | | | 384/448 |
| 2017/0108406 A1 * | 4/2017 | Thomson | ............... | G01M 13/045 |
| 2019/0154721 A1 * | 5/2019 | Falossi | ............... | F16C 41/007 |
| 2022/0043018 A1 * | 2/2022 | Lim | ............... | G01P 3/443 |
| 2022/0307941 A1 * | 9/2022 | Garner | ............... | G01M 13/045 |

* cited by examiner

DEVICE FOR MONITORING THE DEGRADATION OF ROLLING BEARINGS

FIELD OF THE INVENTION

The present invention relates to the field of monitoring the degradation of rolling bearings in a rotating machine.

STATE OF THE ART

In the field of rotating machines, the rotational guiding between the rotor and the stator has several functions: maintaining a constant air gap between the rotor and the stator to reduce the forces generated by the unbalanced magnetic attraction in the case of an electric machine, avoiding any unwanted contact between the rotor and the stator, maintaining the axial position of the rotor relative to the stator, allowing a rotation with low mechanical losses of the rotor and taking up the loads internal (of magnetic or mechanical origin) and external to the machine. Traditionally, several technologies are known for ensuring the rotational guiding. In particular, the "plain" type bearings which are very simple mechanical parts but with which the guiding is done via a sacrificial part are known. In other words, the plain bearings deform and wear out very quickly. In addition, they generally have a low coefficient of heat conduction. In other words, they generally do not allow good heat removal.

The hydrostatic-type bearings are also known, with which the guiding is done by maintaining a pressure of a fluid in an air gap, which requires a hydraulic circuit which can be complex depending on the configuration of the rotating machine.

Likewise, there are hydrodynamic-type bearings with which the guiding is created by a pressure of a fluid generated by the rotation. Likewise, the implementation of these bearings can be complex.

Finally, the rolling element bearings more commonly called bearings are known. It is a simple and inexpensive mechanical solution that allows guiding in rotation and absorbing axial and/or radial loads. Traditionally, the rolling elements can be balls, rollers or needles. The materials can be steel, plastics or ceramics. Nevertheless, the rolling element bearings are sensitive to problems of lack of lubrication, pollution and temperature.

However, the degradation of a bearing can generate performance losses in the rotating machine, an increase in the heating due to the increase in the resisting torque of the bearings and/or to a contact between the rotor and the stator of the rotating machine. Ultimately, the degradation of the bearings can even cause the destruction of part of the rotating machine.

To avoid these problems, different monitoring techniques exist for detecting anomalies in the bearings, either by temperature monitoring, or by monitoring of the signature of the vibrations, or by monitoring of the quality of the movement of the rolling elements. The problem with this monitoring is that the phenomena leading to a rapid change in the monitored parameters can, on high-energy machines (rotor of significant mass and rotating at high speed), be short-term phenomena and lead to equipment unavailability in an insufficiently long period of time to allow corrective maintenance.

In this context, it is necessary to provide a device for monitoring the degradation of rolling bearings, which allows detecting simply and quickly enough a degradation to be able to initiate a maintenance action.

DISCLOSURE OF THE INVENTION

According to a first aspect, the invention proposes a device for monitoring the degradation of rolling bearings in a rotating machine comprising at least two rolling bearings each having two concentric rings in rotation relative to each other, at least one ring of each bearing being rotatably connected to a ring of another bearing. The device comprises a member for measuring the speed of rotation of the rotatably connected rings, and data processing means adapted to detect a variation in said speed of rotation of the rotatably connected rings representative of a degradation of a bearing.

In a particularly advantageous manner, the monitoring of the variation in the speed of rotation of the rotatably connected rings allows early detecting a degradation of a bearing. Indeed, in case of degradation, the resisting torque of the rolling bearing will immediately increase, which will immediately influence the speed of rotation. Thus, from the first signs of degradation, the resisting torque will increase, which will decrease the speed, long before the occurrence of possible heating or vibrations.

Said at least two bearings can be disposed in axial series with respect to an axis of rotation.

Each bearing may have an inner ring and an outer ring, the rotatably connected rings being the outer rings.

A single outer ring may be common to several bearings.

Said at least two bearings can be disposed in radial series with respect to an axis of rotation.

Each bearing may have an outer ring and an inner ring, an outer ring of a bearing being rotatably connected to an inner ring of another bearing.

A single ring can be both the outer ring of one bearing and the inner ring of another bearing.

The measuring member can be selected among a hall-effect sensor, a phonic wheel-type sensor, a direct current generator or a resolver.

The bearings can be selected among single or multiple row ball bearings, needle bearings, combined needle and ball bearings, single or multiple row cylindrical roller bearings, tapered roller bearings or radial ball-joints.

According to a second aspect, the invention relates to a method for monitoring the degradation of rolling bearings in a rotating machine comprising at least two rolling bearings each having two concentric rings in rotation relative to each other, at least one ring of each bearing being rotatably connected to a ring of another bearing, the method being characterized in that it comprises, when said rotating machine is in rotation, the following steps:
  measuring the speed of rotation of the rotatably connected rings by a measuring member;
  detecting a variation in the speed of rotation of the rotatably connected rings representative of a degradation of a bearing;
  reporting a degradation of a bearing.

DESCRIPTION OF THE FIGURES

Other characteristics, aims and advantages of the invention will emerge from the following description which is purely illustrative and not limiting, and which should be read with reference to the appended drawings in which.

In all of the figures, similar elements have identical references.

DETAILED DESCRIPTION OF THE INVENTION

Figure 1:
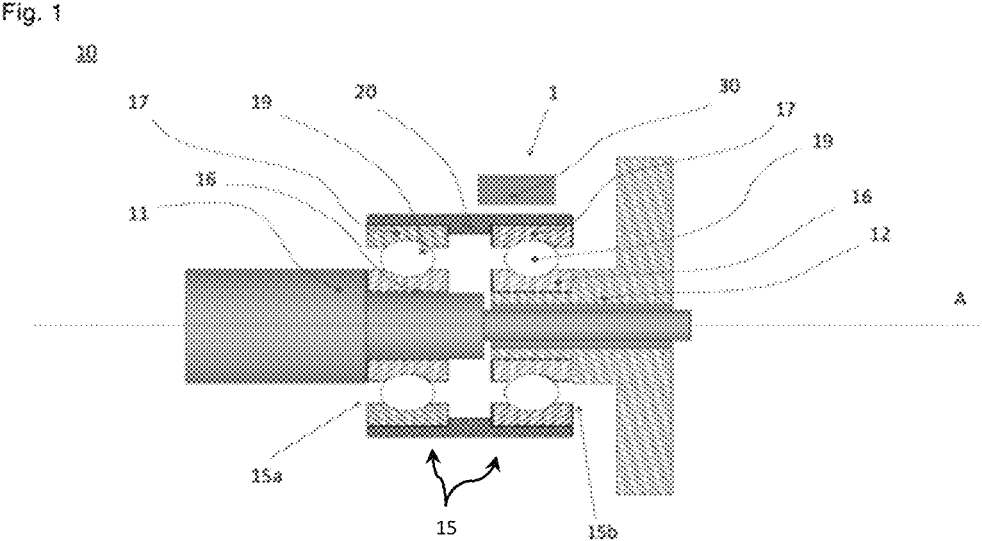
FIG. 1 is a schematic representation of a portion of a rotating machine comprising a monitoring device according to a first embodiment of the invention.

According to a first aspect, the invention relates to a device for monitoring 1 the degradation of rolling bearings in a rotating machine 10.

Rotating Machine

Referring to FIGS. 1 to 4, according to the examples presented here, the rotating machine 10 comprises a shaft 11 in rotation about an axis A in a bore 12. According to other embodiments, the rotating machine 10 could have a bore 12 rotating about a fixed shaft 11. In addition, the rotating machine comprises at least two rolling bearings 15a, 15b each having two concentric rings 16-18 in rotation to each other about the axis A. According to the examples presented here, the rolling bearings 15a, 15b are single row ball bearings 19. However, according to other examples, the rolling bearings 15a, 15b could be multiple row ball bearings, needle bearings, combined needle and ball bearings, single or multiple row cylindrical roller bearings, tapered roller bearings or radial ball-joints.

Arrangements of the Bearings

According to the first and the second embodiment (FIGS. 1 to 3), the bearings 15a, 15b are in axial series, with respect to the axis of revolution A. This means that the bearings 15a, 15b are distributed longitudinally on the shaft 11.

Figure 4:
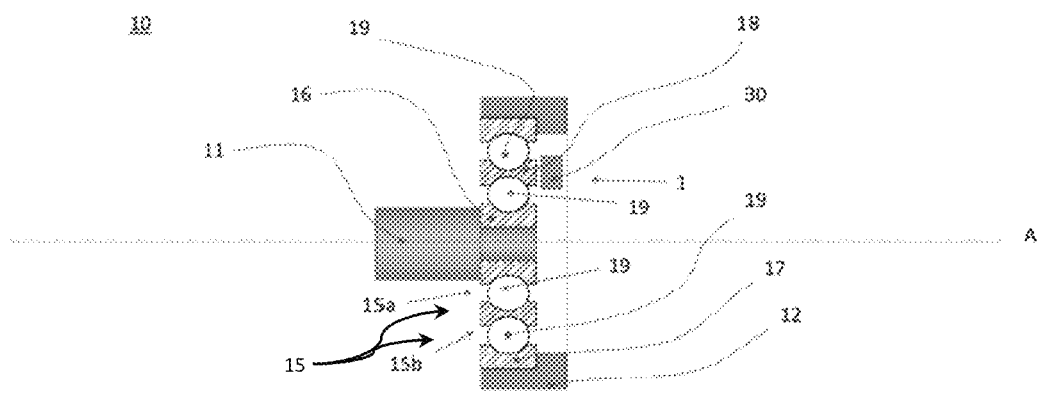
FIG. 4 is a schematic representation of a portion of a rotating machine comprising a monitoring device according to a third embodiment of the invention.

According to the third embodiment shown in FIG. 4, the bearings 15a, 15b are disposed in radial series with respect to the axis of revolution A.

According to other embodiments, the bearings 15a, 15b where appropriate of a number greater than two, could be disposed in more complex series, including both axial and radial series. In other words, bearings 15a, 15b could be disposed longitudinally on the shaft 11 and radially. The present invention will not be limited to any configurations of bearings.

Arrangement of the Rings

Traditionally, each bearing 15a, 15b has two rings 16-18: an inner ring 16, 18 and an outer ring 17-18.

Figure 2:
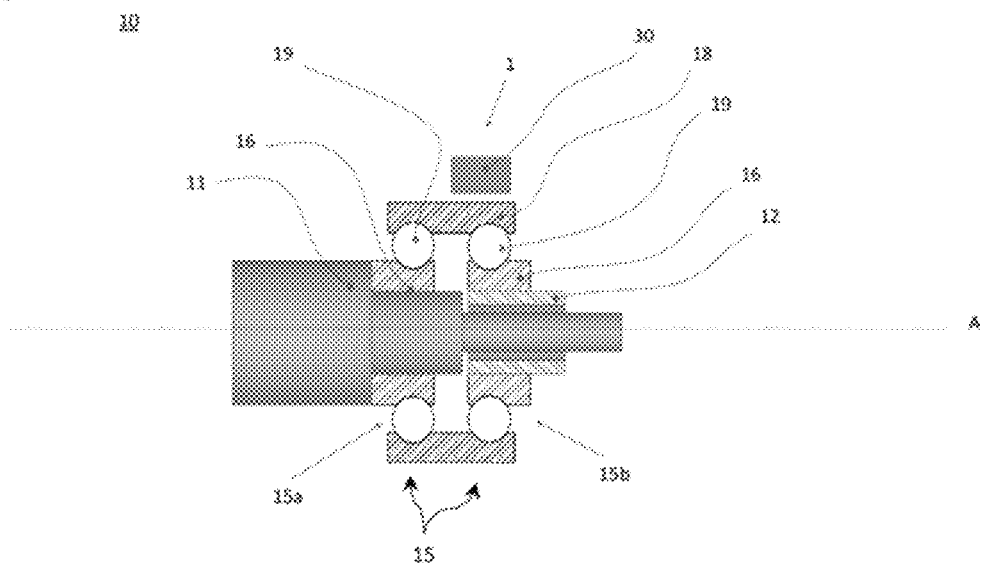
FIG. 2 is a schematic representation of a portion of a rotating machine comprising a monitoring device according to a second embodiment of the invention.
Figure 3:
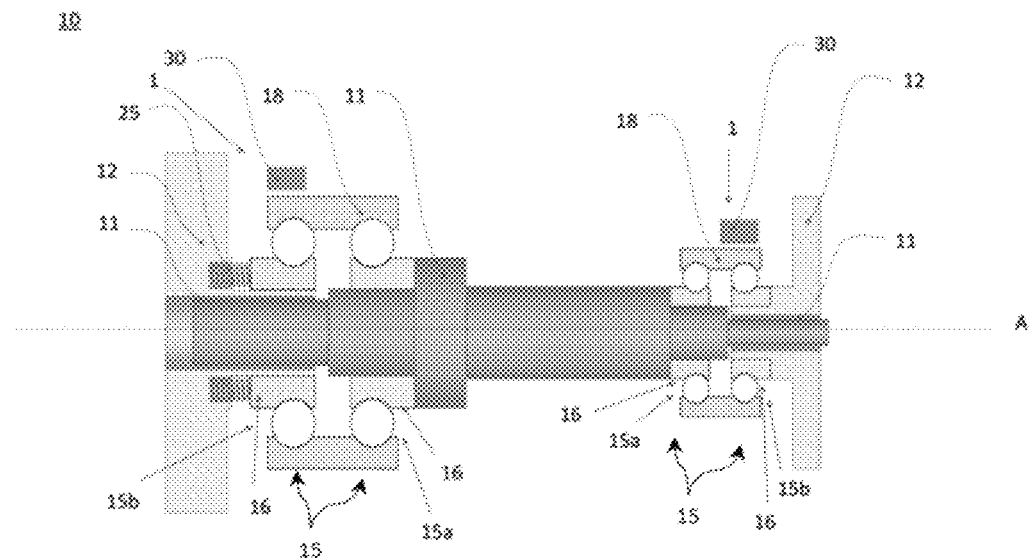
FIG. 3 is a schematic representation of a portion of a rotating machine comprising two monitoring devices according to a second embodiment of the invention.

Preferably, as represented in FIGS. 1 to 3, at least one ring 17, 18 of each bearing 15a is rotatably connected to a ring 17, 18 of another bearing 15b.

It is specified that by "rotatably connected", it is meant that the two rings are fixed to each other, so that the rotation of one causes the rotation of the other, about the same axis of rotation A. More specifically, the two rotatably connected rings have the same speed of rotation, denoted $\omega_1$.

In a particularly preferable manner, as represented in FIG. 1, the rotational connection of the two rings 16, 17, 18 is achieved by an intermediate part 20. The intermediate part 20 connects the two rings 16, 17, 18 and ensures the connection in rotation about the axis A. Thus, the intermediate part 20 connects two outer rings 17 of two different bearings 15a, 15b.

In a more preferable manner, corresponding to the second and third embodiments, represented in FIGS. 2 to 4, the same part is a ring 18 for two bearings 15a, 15b. In other words, two separate bearings 15a, 15b share the same ring 18.

According to the second embodiment, the bearings 15 being in axial series, the ring 18 corresponds to the outer ring of the two bearings 15 it connects.

According to the third embodiment, the bearings 15a, 15b being in radial series, the ring 18 is the outer ring of a bearing 15a and the inner ring of the other bearing 15b. In other words, according to this embodiment, the bearings 15a, 15b are arranged as follows, starting from the shaft 11 towards the bore 12: an inner ring 16 of a first bearing 15a, balls 19 of the first bearing 15a, the ring 18 shared by the two bearings 15a, 15b, balls 19 of the second bearing 15b and the outer ring 17 of the second bearing 15b. In a more general manner, not represented, the outer ring of the bearing 15a can be rotatably connected to the inner ring of the bearing 15b (so as to form a single kinematic entity).

According to one embodiment not represented, the bearings 15a, 15b could be in axial and radial series, so that the arrangement of the rings 16-18 would be the combination of the third embodiment with the first and/or the second embodiment.

It should be noted that the usual techniques for mounting the bearings 15a, 15b can be used (clamping and locking condition). Likewise, as represented in FIG. 3, by the springs 25, it is possible to apply a pre-stress on the rings 16-18 of the bearings. In this case, in the case of the example shown in FIG. 3, the pre-stress is applied to the inner ring 16 of one of the bearings 15.

Monitoring Device

The monitoring device 1 implemented in the rotating machine 10 comprises a member for measuring 30 the speed of rotation of the rotatably connected rings, and data processing means adapted to detect a variation in said speed of rotation of the rotatably connected rings representative of a degradation of a bearing.

Typically, the measuring member 30 can be selected among a hall-effect sensor, a phonic wheel-type sensor, a direct current generator or a resolver.

The data processing means can be an on-board microcontroller in a dedicated system, or in the rotating machine 10 or in a computer connected to the rotating machine 10.

In operation, the measuring member 30 records the speed of rotation $\omega_1$ of the rings 17, 18, and transmits these data to the data processing means. The data processing means are configured to analyze this speed of rotation over time and to detect variations thereof. Furthermore, the data processing means are configured to determine whether a detected variation is normal (for example: variation in the rpm of the rotating machine 10, variation in the outside temperature or in the hygrometry), or abnormal. As such, the data processing means can further have suitable parameters such as an rpm speed, external physical quantities, etc. In case of abnormal variation (i.e. unrelated to the rpm of the rotating machine or to environmental conditions, i.e. unexpected), the processing means issue a warning.

This warning can be for example a visual or audible alarm, or a notification on a computer or a mobile terminal. It can also be envisaged that the processing means can stop the rotating machine 10.

Indeed, an unexpected speed variation is representative of a degradation of a bearing 15a, 15b. The principle is as follows:

In nominal operation, the shaft rotates at a speed of rotation ω. When the bearings 15a, 15b, are in good condition, the rotatably connected rings 17, 18 rotate at a speed $\omega_1$ approximately equal to half the speed of rotation of the shaft, i.e. ω/2.

In case where the first bearing 15a is degraded (i.e. the one mounted on the shaft 11), its resisting torque will increase, which will bring the speed of rotation of the outer ring 17, 18 closer to that of the shaft, that is to say increase the speed of rotation $\omega_1$. In this case, this then gives the following equation: $\omega/2 < \omega_1 < \omega$.

In case where the second bearing 15b is degraded (i.e. the one mounted on the bore 12), its resisting torque will increase, which will bring the speed of rotation of the outer rings 17, 18 closer to that of the bore 12 (which is defined as zero), that is to say reduce the speed of rotation c). In this case, this then gives the following equation: $0 < \omega_1 < \omega/2$.

It is specified that the operating principle is the same for the third embodiment, with the only difference that in nominal operation, the speed of rotation of the ring 18 does not necessarily correspond to half the speed of rotation of the shaft 11 (this depends on the dimensions and masses of the bearings 15a, 15b), but the variations will be identical.

Whatever the embodiment, the measurement of the speed of rotation of the rotatably connected rings 17, 18 allows detecting particularly early the failure of a bearing 15a, 15b.

Depending on the measured speed of rotation, the processing means could deduce therefrom which bearing 15a or 15b is damaged. This determination could be made by knowing the speed of rotation of the rotating machine 10, and the specific parameters of each bearing 15a, 15b (coefficient of friction, viscosity index of the lubricant used, stiffness of the balls, etc.).

Monitoring Method and Operation of the Device

According to a second aspect, the invention relates to a method for monitoring the degradation of the rolling bearings 15a, 15b in a rotating machine 10 comprising at least two rolling bearings 15a, 15b each having two concentric rings 16-18 in rotation relative to each other. At least one ring 17, 18 of each bearing 15a is rotatably connected to a ring 16, 17, 18 of another bearing 15b.

The method comprises, when said rotating machine 10 is in rotation, the following steps:
measuring the speed of rotation $\omega_1$ of the rotatably connected rings 17, 18 by the measuring member 30;
detecting a variation in the speed of rotation G1 of the rotatably connected rings 17, 18, representative of a degradation of a bearing 15a, 15b;
reporting a degradation of a bearing 15a, 15b.

Figure 5:
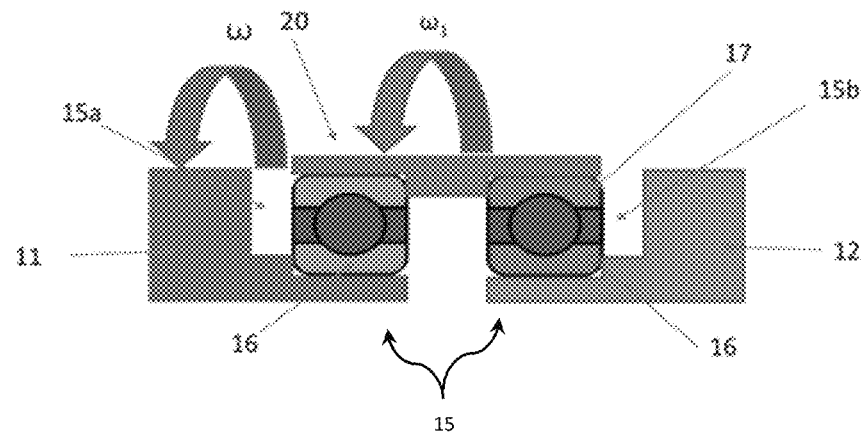
FIG. 5 is a schematic representation of the operation of a monitoring device according to a second embodiment of the invention.

Referring to FIGS. 5 and 6, in the case of the first and second embodiments, the operation can be schematized as follows:

In nominal operation, the shaft rotates at a speed of rotation ω. When the bearings 15a, 15b are in good condition, the rotatably connected rings 17 rotate at a speed $\omega_1$ about equal to half the speed of rotation of the shaft, i.e. ω/2.

In case where the first bearing 15a is degraded (i.e. the one mounted on the shaft 11), its resisting torque will increase, which will bring the speed of rotation of the outer ring 18 closer to that of the shaft, that is to say increase the speed of rotation $\omega_1$. In this case, this then gives the following equation: $\omega/2 < \omega_1 < \omega$.

In case where the second bearing 15b is degraded (i.e. the one mounted on the bore 12), its resisting torque will increase, which will bring the speed of rotation of the outer ring 18 closer to that of the bore (which is defined as zero), that is to say reduce the speed of rotation c). In this case, this then gives the following equation: $0 < \omega_1 < \omega/2$.

It is specified that the operating principle is the same for the third embodiment, with the only difference that in nominal operation, the speed of rotation of the ring 18 does not correspond to half the speed of rotation of the shaft 11.

Whatever the embodiment, the measurement of the speed of rotation of the rotatably connected rings 17, 18 allows detecting particularly early the failure of a bearing 15a, 15b.

The invention claimed is:

1. A device for monitoring the degradation of rolling bearings in a rotating machine comprising a shaft and a bore, the device comprising:
    at least two rolling bearings each having two concentric rings in rotation relative to each other, at least one concentric ring of the concentric rings of each rolling bearing being rotatably connected to a ring of another one of the rolling bearings,
    a member for measuring a speed of rotation of the rotatably connected concentric rings, and
    data processing means adapted to detect a variation in said measured speed of rotation ($\omega_1$) with respect to a speed of rotation of the shaft or bore of the rotating machine, and configured to determine whether said detected variation is normal or representative of a degradation of one of the rolling bearings (15).

2. The device according to claim 1, wherein the member for measuring the speed of rotation of the rotatably connected rings (30) is selected among a hall-effect sensor, a phonic wheel-type sensor, a direct current generator or a resolver.

3. The device according to claim 1, wherein the rolling bearings are selected among single or multiple row ball bearings, needle bearings, combined needle and ball bearings, single or multiple row cylindrical roller bearings, tapered roller bearings or radial ball-joints.

4. The device according to claim 1 wherein said at least two rolling bearings are disposed in axial series with respect to an axis of rotation.

5. The device (1) according to claim 4, wherein the measuring member (30) is selected among a hall-effect sensor, a phonic wheel-type sensor, a direct current generator or a resolver.

6. The device (1) according to claim 4, wherein the bearings (15a, 15b) are selected among single or multiple row ball bearings (19), needle bearings, combined needle and ball bearings, single or multiple row cylindrical roller bearings, tapered roller bearings or radial ball-joints.

7. The device according to claim 4, wherein the concentric rings of each rolling bearing comprises an inner ring and an outer ring and wherein the at least one concentric ring of the concentric rings of each rolling bearing being rotatably connected to a concentric ring of another one of the rolling bearings is the outer ring.

8. The device (1) according to claim 7, wherein the measuring member (30) is selected among a hall-effect sensor, a phonic wheel-type sensor, a direct current generator or a resolver.

9. The device (1) according to claim 7, wherein the bearings (15a, 15b) are selected among single or multiple row ball bearings (19), needle bearings, combined needle and ball bearings, single or multiple row cylindrical roller bearings, tapered roller bearings or radial ball-joints.

10. The device according to claim 7 wherein several rolling bearings of the at least two rolling bearings comprise a common outer ring.

11. The device (1) according to claim 10, wherein the measuring member (30) is selected among a hall-effect sensor, a phonic wheel-type sensor, a direct current generator or a resolver.

12. The device (1) according to claim 10, wherein the bearings (15a, 15b) are selected among single or multiple row ball bearings (19), needle bearings, combined needle and ball bearings, single or multiple row cylindrical roller bearings, tapered roller bearings or radial ball-joints.

13. The device according to claim 1, wherein said at least two rolling bearings are disposed in radial series with respect to an axis of rotation.

14. The device (1) according to claim 13, wherein the measuring member (30) is selected among a hall-effect sensor, a phonic wheel-type sensor, a direct current generator or a resolver.

15. The device (1) according to claim 13, wherein the bearings (15a, 15b) are selected among single or multiple row ball bearings (19), needle bearings, combined needle and ball bearings, single or multiple row cylindrical roller bearings, tapered roller bearings or radial ball-joints.

16. The device according to claim 13, wherein the concentric rings of each rolling bearing comprises an outer ring and an inner ring and wherein the at least one concentric ring of the concentric rings of each rolling bearing being rotatably connected to a concentric ring of another one of the rolling bearings is an outer ring rotatably connected to an inner ring of another one of the rolling bearings.

17. The device (1) according to claim 16, wherein the measuring member (30) is selected among a hall-effect sensor, a phonic wheel-type sensor, a direct current generator or a resolver.

18. The device according to claim 16, wherein the outer ring of one of the rolling bearings is the inner ring of another one of the rolling bearings.

19. The device (1) according to claim 18, wherein the measuring member (30) is selected among a hall-effect sensor, a phonic wheel-type sensor, a direct current generator or a resolver.

20. A method for monitoring the degradation of rolling bearings in a rotating machine comprising a shaft and a bore, the method comprising at least two rolling bearings each having two concentric rings in rotation relative to each other, at least one concentric ring of the concentric rings of each rolling bearing being rotatably connected to a concentric ring of another one of the rolling bearings, the method comprising, when said rotating machine is in rotation, the steps of:

measuring a speed of rotation of the rotatably connected concentric rings by a measuring member;

detecting a variation in the measured speed of rotation with respect to a speed of rotation of the shaft or bore of the rotating machine, said variation being representative of a degradation of one of the rolling bearings;

reporting a degradation of one of the rolling bearings.

* * * * *